US005163468A

United States Patent [19]

Robinson et al.

[11] Patent Number: 5,163,468

[45] Date of Patent: Nov. 17, 1992

[54] FUEL PRESSURE REGULATOR

[75] Inventors: Barry S. Robinson; Randall M. Mahnke, both of Newport News; Michael J. Hornby, Williamsburg, all of Va.

[73] Assignee: Siemens Automotive L.P., Auburn Hills, Mich.

[21] Appl. No.: 838,508

[22] Filed: Feb. 19, 1992

[51] Int. Cl.[5] .................... F02M 69/54; G05D 16/18

[52] U.S. Cl. .................................. 137/315; 123/463; 137/510; 137/550

[58] Field of Search ...................... 137/315, 510, 550; 123/447, 456, 463, 467

[56] References Cited

U.S. PATENT DOCUMENTS 4,237,924 12/1980 Benjamin et al. .................. 137/510
4,562,816 1/1986 Dörr .................................. 123/456
4,883,088 11/1989 Herbst ................................ 137/510
4,903,667 2/1990 Sonnenmoser et al. ........ 123/467 X
5,076,320 12/1991 Robinson ........................ 137/510 X

*Primary Examiner*—Stephen M. Hepperle
*Attorney, Agent, or Firm*—George L. Boller; Russel C. Wells

[57] ABSTRACT

The fuel pressure regulator has a new and unique means for integrating the filter screen and axially capturing one of two O-rings seals. A crimp and a shoulder on the outlet tube unite the outlet tube, the housing, and a washer that in one embodiment performs both the function of sandwiching the filter screen between itself and the wall of the housing through which the outlet tube passes and the function of cooperating with the housing in defining the groove which captures one of the two O-ring seals. The invention offers meaningful improvements in both manufacturing and cost.

8 Claims, 1 Drawing Sheet

FUEL PRESSURE REGULATOR

FIELD OF THE INVENTION

This invention relates to fuel pressure regulators of the type used for regulating the pressure of fuel in the fuel rail of an internal combustion engine fuel injection system.

BACKGROUND AND SUMMARY OF THE INVENTION

Certain known fuel pressure regulators do not axially capture associated O-ring seals, and as a consequence, it is possible for the seals to become accidentally separated from the fuel pressure regulator when it is removed from its fuel rail. It is therefore preferable for the seals to be axially captured on a fuel pressure regulator so that they do not become accidentally separated, and certain other fuel pressure regulators are constructed to axially capture the associated O-rings seals so that the O-rings stay on the fuel pressure regulator when it is removed from its fuel rail.

One known fuel pressure regulator that captures its O-rings comprises a multiple part housing, consisting of one stamping and two screw-machined parts, and requiring brazing and crimping operations in its manufacture. It has a brazed joint that must be completely leak-proof. To assure quality in a mass-production setting, the brazed joint of each valve must be pressure-tested, and because of the nature of the mass-production process, not all valves will be found to have completely leak-proof brazed joints. The use of a brazed joint, the necessity for pressure-testing it, and the improbability of obtaining a completely leak-proof brazed joint in every fuel pressure regulator makes that design relatively expensive. Moreover, that fuel pressure regulator does not integrate the filter screen because it uses a separate plastic filter element.

Commonly assigned U.S. Pat. No. 5,076,320 discloses a fuel pressure regulator having captured O-ring seals and a filter screen. Another patent relating to a fuel pressure regulator is U.S. Pat. No. 4,883,088. The latter has a plastic filter screen that is fitted onto the outside of the fuel pressure regulator.

The present invention relates to an improved fuel pressure regulator having an integral filter screen and captured O-ring seals. The fuel pressure regulator of the present invention is an improvement because of the new and unique means for integrating the filter screen and axially capturing one of two O-rings seals. The invention comprises the use of only a crimp and a shoulder on the outlet tube to unite the outlet tube, the fuel pressure regulator housing, and a washer that in one embodiment performs both the function of sandwiching the filter screen between itself and the wall of the housing through which the outlet tube passes and the function of cooperating with the housing in defining the groove which captures one of the two O-ring seals. The fuel enters the fuel pressure regulator via overlapping through-holes in the washer and the housing wall between which the filter screen is disposed so that only filtered fuel actually enters the fuel pressure regulator housing. In another embodiment the filter screen is attached to the exterior of the washer in covering relation to the overlapping through-holes. The invention offers meaningful improvements in both manufacturing and cost.

The foregoing, along with additional features, advantages, and benefits of the invention, will be seen in the ensuing description and claims which should be considered in conjunction with the accompanying drawings. The drawings disclose a presently preferred embodiment of the invention according to the best mode contemplated at this time for carrying out the invention.

DESCRIPTION OF THE PREFERRED EMBODIMENT

Figure 1:
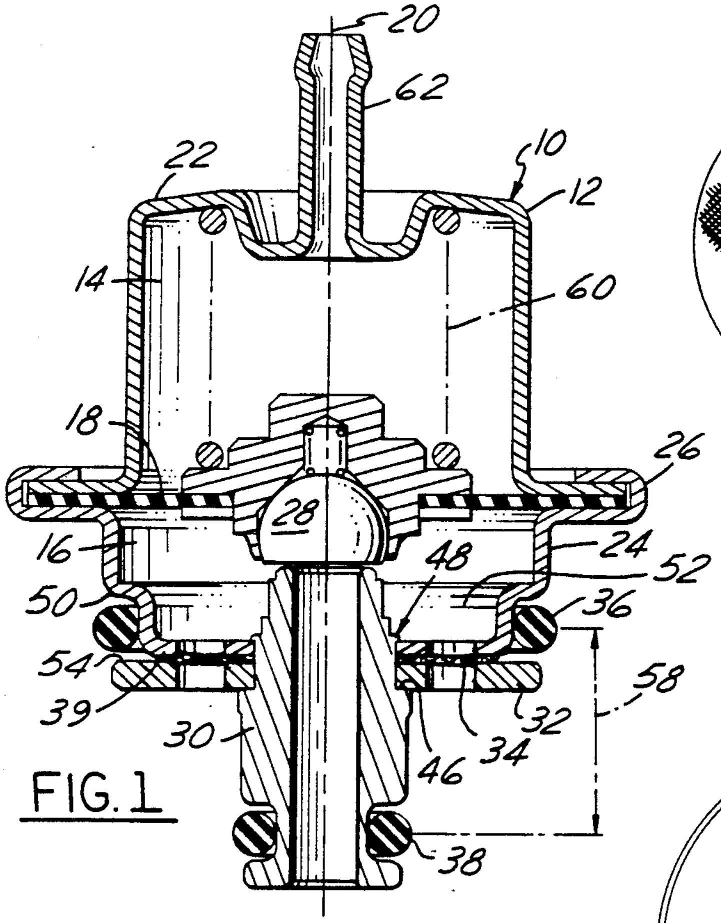
FIG. 1 is a longitudinal cross-sectional view through a presently preferred embodiment of fuel pressure regulator according to the present invention.

A fuel pressure regulator 10 comprises a housing 12 whose interior is divided into a fuel chamber 14 and a control chamber 16 by a movable wall 18 that is arranged transverse to a main longitudinal axis 20 of the fuel pressure regulator. Housing 12 comprises two stamped metal parts, namely an upper housing part 22 and a lower housing part 24. The outer peripheral margin of movable wall 18 is held in a fluid-tight manner by a joint 26 that unites the two housing parts. A valve member 28, like that shown in commonly assigned U.S. Pat. No. 4,928,729, is centrally disposed on movable wall 18 in fuel chamber 14 coaxial with axis 20.

Fuel pressure regulator 10 further includes an outlet tube 30, a washer 32, a filter screen 34, and two O-ring seals 36, 38. Outlet tube 30 is arranged coaxial with axis 20 and passes through a circular hole in the transverse end wall 39 of lower housing part 24. Internally of chamber 14 tube 30 presents a valve seat 40 to valve member 28. Externally it has an O-ring groove that is disposed in spaced relation to washer 32 and that axially captures O-ring seal 38.

Figure 3:
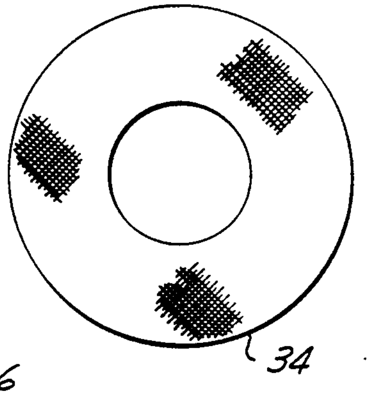
FIG. 3 is a bottom plan view of another element of the fuel pressure regulator of FIG. 1 shown by itself.
Figure 4:
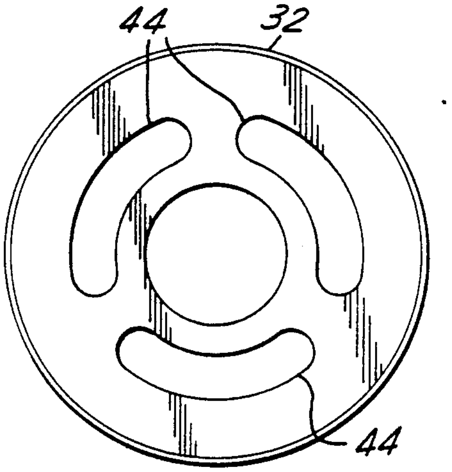
FIG. 4 is a bottom plan view of still another element of the fuel pressure regulator of FIG. 1 shown by itself.
Figure 2:
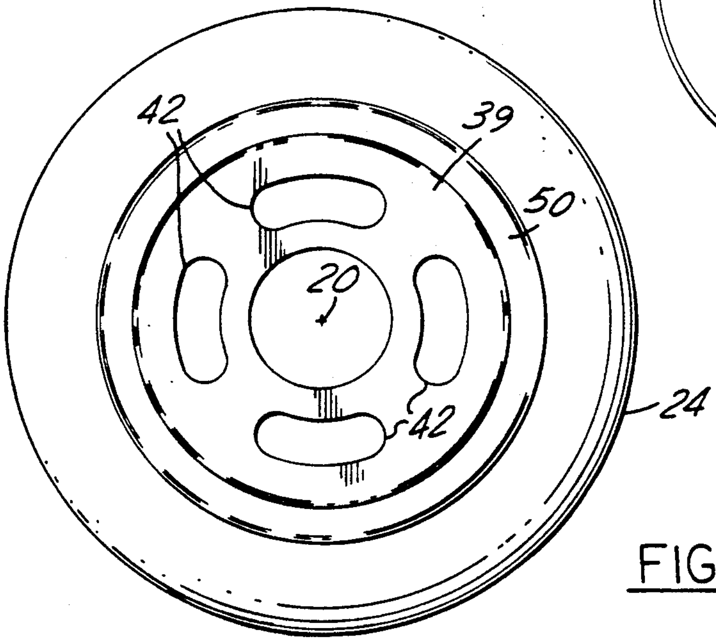
FIG. 2 is a bottom plan view of one element of the fuel pressure regulator of FIG. 1 shown by itself.

Filter screen 34 is disposed between washer 32 and transverse end wall 39 of lower housing part 24. End wall 39 contains four arcuate through-slots 42 uniformly arranged about axis 20 in outwardly spaced relationship to the circular hole through which tube 30 passes. (See FIG. 2.) Slots 42 form the fuel inlet to fuel chamber 14. Filter screen 34 has a circular annular shape (See FIG. 3.) and is disposed in covering relation to end wall 39 so that fuel which is to enter fuel chamber 14 via the fuel inlet must first pass through filter screen 34. Washer 32 is disposed in covering relation to filter screen 34, and comprises three arcuate through-slots 44 uniformly arranged about axis 20 on a common circle with slots 42. (See FIG. 4.) Slots 44 provide for fuel to pass through washer 32, and then in succession filter screen 34 and slots 42, on its way into fuel chamber 14.

Filter screen 34 is held axially captured between end wall 39 and washer 32, and the three parts 34, 24, and 32 are united in assembly with tube 30 without the use of a brazed joint. This is accomplished by providing tube 30 with a shoulder 46 and a size that allows the three parts 34, 24, and 32 to be assembled onto the tube over the tube's seat end until the inner margin of washer 32 abuts shoulder 46; then tube 30 is locally deformed by a crimping tool to create a crimp 48 that bears against the inner margin of end wall 39 surrounding the hole in part 24 through which the tube passes. Such assembly is performed before movable wall 18 and upper housing part 22 are assembled to lower housing part 24. The shoulder and crimp hold the parts in a secure assembly which need not be completely leak-proof. This is because the joint is within the pressurized fuel zone that is bounded by O-rings 36 and 38 when the fuel pressure regulator is disposed in its receptacle in a fuel rail.

Lower housing part 24 is shaped to have two walls 50, 52 that form one side and the bottom of the groove that receives O-ring 36. The other side of the groove is provided by the outer margin 54 of washer 32. O-ring 36 may be assembled into its groove either before or after the crimping operation.

When the fuel pressure regulator is assembled into a fuel rail receptacle, O-rings 36, 38 seal to the receptacle wall to axially bound a zone of pressurized fuel, schematically depicted by the number 58 in FIG. 1. Fuel will be present in both that zone as well as in fuel chamber 14, and thus the joint between parts 24, 30, and 32 does not have to be completely leak-proof. It should not of course be sufficiently loose that particulate material that would otherwise be filtered by filter screen 34 is allowed to pass to fuel chamber 14. In use, fuel pressure regulator 10 performs the fuel pressure regulation function in known manner. Control chamber 16 contains the usual spring 60 that resiliently urges movable wall 18 toward fuel chamber 14 so that valve member 28 is resiliently urged to coaction with seat 40. Upper housing part 22 also has the usual nipple 62 for communicating control chamber 16 to engine intake manifold vacuum. Filter screen 34 is effective to prevent fuel-entrained particulates greater than a certain size from entering the fuel chamber where they might interfere with the pressure regulation function. The particular patterns for through-slots 42, 44 are advantageous because they allow parts 24 and 32 to be assembled without regard to circumferential orientation. While there will be some partial obstruction of through-slots 42 by washer 32 regardless of the relative circumferential orientation between parts 24 and 32, it will also be assured that there is at least a certain minimum area that is open regardless of relative circumferential orientation between the two parts, and this minimum area is sufficiently large that it imposes no significant restrictive effect.

Another embodiment of fuel pressure regulator is exactly like that shown except that the annular filter screen is not sandwiched between washer 32 and housing 12, but rather is sized for disposition against the exterior face of the washer in covering relation to through-holes 44. By making the washer and filter screen both of steel, the two may be united by welding the inner and outer margins of the screen to the washer.

While a presently preferred embodiment of the invention has been illustrated and described, it is to be appreciated that principles are applicable to other embodiments that are the equivalent of the following claims.

What is claimed is:

1. A fuel pressure regulator comprising a housing divided into a fuel chamber and a control chamber by a movable wall which carries a valve element, a fuel inlet to said fuel chamber via which pressurized fuel enters said fuel chamber, a fuel outlet via which excess fuel exits said fuel chamber comprising a tube that presents a valve seat within said fuel chamber to said valve element and that passes from said fuel chamber through a wall of said housing, said control chamber comprising control means acting on said movable wall for urging said valve element toward said valve seat against the force exerted on said movable wall by pressurized fuel in said fuel chamber, characterized in that said fuel inlet is disposed in said wall adjacent the passage of said tube through said wall, a filter screen for filtering particulate material from fuel is disposed against the exterior of said wall in covering relation to said fuel inlet, an annular member is disposed against said filter screen such that said filter screen is axially held between said annular member and said wall, said annular member and said housing cooperatively defining a groove which is disposed in circumferentially bounding relation to said inlet for retaining and axially capturing an O-ring seal that is disposed therein to provide circumferential sealing of said housing to a pressurized fuel supply zone of a receptacle within which the fuel pressure regulator is intended to be disposed for use, said annular member having through-hole means for exposing said inlet via said filter screen to such a pressurized fuel supply zone, and retention means acting on said annular member and said wall to cause said annular member and said wall to hold said filter screen between them and to unite said annular member and said wall to said tube, said retention means comprising a shoulder and a crimp that are axially spaced apart on said tube.

2. A fuel pressure regulator as set forth in claim 1 in which said shoulder is disposed to bear directly against one of said wall and annular member and said crimp is disposed to bear directly against the other of said wall and annular member.

3. A fuel pressure regulator as set forth in claim 2 in which said shoulder is disposed to bear directly against annular member and said crimp is disposed to bear directly against the other of said wall and annular member.

4. A fuel pressure regulator as set forth in claim 1 in which said groove comprises two axially spaced apart radial wall portions forming the sides of the groove and an axial wall portion forming the bottom of the groove, and in which one of said radial wall portions and said axial wall portion are in said housing, and the other of said radial wall portions is in said annular member.

5. A fuel pressure regulator as set forth in claim 4 in which said tube has an exterior portion disposed on exteriorly of said housing, said exterior portion having a groove which is disposed in circumferentially bounding relation for retaining and axially capturing an O-ring seal that is disposed therein to provide circumferential sealing of said tube to such a pressurized fuel supply zone.

6. A fuel pressure regulator as set forth in claim 1 in which said filter screen is stainless steel.

7. A fuel pressure regulator as set forth in claim 1 in which said fuel inlet comprises plural arcuate through-slots arranged on a common circle about said tube, and said through-hole means of said annular member comprise plural arcuate through-slots arranged on a common circle about said tube of the same diameter as the common circle on which the arcuate through-slots constituting said fuel inlet are disposed, and wherein the two sets of through-slots are relatively configured such that in any relative circumferential orientation of said annular member to said housing, at least a certain minimum overlapping area between them is assured.

8. A fuel pressure regulator comprising a housing divided into a fuel chamber and a control chamber by a movable wall which carries a valve element, said housing having a fuel inlet via which pressurized fuel enters said fuel chamber, a fuel outlet via which excess fuel exits said fuel chamber comprising a tube that presents a valve seat within said fuel chamber to said valve element and that passes from said fuel chamber through said housing, said control chamber comprising control means acting on said movable wall for urging said valve element toward said valve seat against the force exerted on said movable wall by pressurized fuel in said fuel chamber, characterized in that said fuel inlet is disposed in said wall adjacent the passage of said tube through said wall, and characterized further by the inclusion of filter screen means and an annular member, said annular member and said housing cooperatively defining a groove which is disposed in circumferentially bounding relation to said inlet for retaining and axially capturing an O-ring seal that is disposed therein to provide circumferential sealing of said housing to a pressurized fuel supply zone of a receptacle within which the fuel pressure regulator is intended to be disposed for use, said annular member having through-hole means for exposing said inlet to such a pressurized fuel supply zone, and retention means acting to unite said annular member and said wall to said tube, said retention means comprising a shoulder and a crimp that are axially spaced apart on said tube, and said filter screen means is disposed against said annular member for filtering particulate material from fuel before the fuel reaches said fuel inlet.

* * * * *